United States Patent [19]

Ogasawala et al.

[11] 4,115,716

[45] Sep. 19, 1978

[54] ROTOR OF MAGNETO GENERATOR

[75] Inventors: Nobuhiko Ogasawala, Mito; Mituo Odazima; Yasuaki Watanabe, both of Katsuta, all of Japan

[73] Assignee: Hitachi, Ltd., Japan

[21] Appl. No.: 809,006

[22] Filed: Jun. 22, 1977

[30] Foreign Application Priority Data

Jun. 23, 1976 [JP] Japan .................................. 51-73233

[51] Int. Cl.² ........................................... H02K 21/22
[52] U.S. Cl. ................................................. 310/153
[58] Field of Search .............. 310/70, 70 A, 153, 156, 310/67

[56] References Cited

U.S. PATENT DOCUMENTS

| | | | |
|---|---|---|---|
| 2,892,109 | 6/1959 | Gayler | 310/153 |
| 3,265,913 | 8/1966 | Irwin | 310/153 |
| 3,278,775 | 10/1966 | Eberline | 310/153 |
| 3,663,850 | 5/1972 | Phelon | 310/153 |
| 3,828,212 | 8/1974 | Harkness et al. | 310/153 |
| 4,012,651 | 3/1977 | Burson | 310/153 |

*Primary Examiner*—Donovan F. Duggan
*Attorney, Agent, or Firm*—Craig & Antonelli

[57] ABSTRACT

A rotor structure for a magneto generator is disclosed which comprises a yoke of cup-like shape consisting of a cylindrical wall and a side wall extending from one end of the cylindrical wall, a plurality of magnets provided by permanent magnets disposed on the inner surface of the cylindrical wall of the yoke in a relation spaced apart by a predetermined distance along the circumference of the cylindrical wall. The magnets are maintained in the predetermined positions by a pair of spaced annular holding plates having respective surfaces facing each other to make area contact respectively with and sandwich the magnets in a direction of the axis of the yoke, and a cylindrical holding plate acting to press the magnets against the inner surface of the cylindrical wall of the yoke by making area contact with the inner surfaces of the magnets.

11 Claims, 14 Drawing Figures

ROTOR OF MAGNETO GENERATOR

FIELD OF THE INVENTION

This invention relates to the rotor of magneto generators, and more particularly to an improved rotor structure for use in an outer rotor type magneto generator in which a cup-shaped rotor is disposed outside a stator, and magnetic poles are disposed on the inner surface of the rotor.

DESCRIPTION OF THE PRIOR ART

Various proposals have been made hitherto on the structure of the rotor of magneto generators in an effort to simplify the process of fabrication of the rotor structure.

Figure 1:
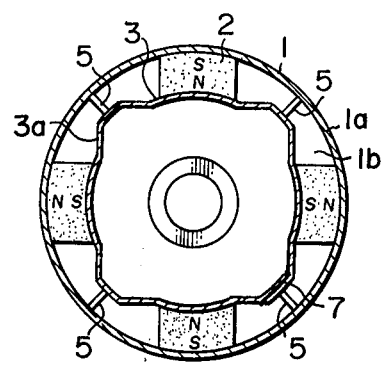
FIG. 1 is a schematic plan view of a prior art rotor structure proposed for use in an outer rotor type magneto generator.
Figure 2:
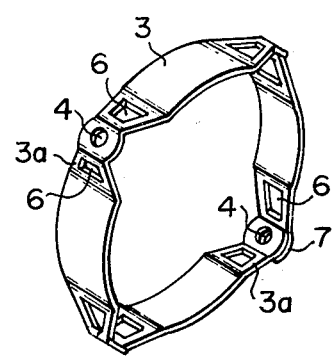
FIG. 2 is a schematic perspective view of a magnet holding member used in the prior art rotor structure shown in FIG. 1.

FIG. 1 shows a prior art rotor structure disclosed in one of such proposals. Referring to FIG. 1, the prior art rotor structure comprises a yoke 1 of cup-like shape consisting of a cylindrical wall 1a and a side wall 1b extending from one end of this cylindrical wall 1a. A plurality of magnets 2 are disposed in predetermined positions on the inner surface of the cylindrical wall 1a of the yoke 1. These magnets 2 are generally provided by permanent magnets such as ferrite magnets and are maintained in the predetermined positions by a magnet holding member 3 having a shape as shown in FIG. 2. This holding member 3 has a plurality of holes 4 through which bolts 5 extend to engage threaded holes bored in the cylindrical wall 1a of the yoke 1, so that the holding member 3 can be fixed to the cylindrical wall 1a of the yoke 1 and can press the magnets 2 against the inner surface of the cylindrical wall 1a of the yoke 1. The holding member 3 is constructed of a magnetic material such as iron, and a plurality of openings 6 are provided in the area 3a between the adjacent magnets 2 so as to increase the magnetic reluctance. The holding member 3 is obtained by cutting a strip from an iron plate by a blanking press and forming the strip into the shape shown in FIG. 2. The ends of the strip are overlapped on each other in one of the inter-pole areas 3a as shown at 7 in FIG. 2.

The rotor constructed in the manner above described has a relatively small number of parts and can be relatively easily assembled. However, from the standpoint of the desired increase in the productivity, the prior art rotor structure has to be yet improved in various aspects due to the fact that the threaded holes must be provided in the cylindrical wall 1a of the yoke 1, the manual bolting is still included, and the position of the bolt holes 4 in the holding member 3 does not always register with the position of the threaded holes provided in the cylindrical wall 1a of the yoke 1. It is to be pointed out further that ferrite magnets, that is, magnets of sintered ferrite are used as the magnets 2 as described, and this sintered ferrite is brittle in its mechanical properties as is commonly known in the art. Thus, during assembling or during operation in which the rotor rotates at a high speed, the magnets 2 may be partly broken and fragments thereof may fall into the rotor tending to give rise to operational problems which obstruct the proper operation of the magneto generator.

SUMMARY OF THE INVENTION

It is a primary object of the present invention to provide an improved rotor structure for use in a magneto generator, which can be produced with increased productivity and which can improve the reliability of the magnets.

The rotor structure according to the present invention is featured by the fact that a plurality of magnets are supported and fixed in predetermined positions by being entirely surrounded by a yoke and a plurality of magnet holding members.

DETAILED DESCRIPTION OF THE PREFERRED EMBODIMENTS

Figure 3:
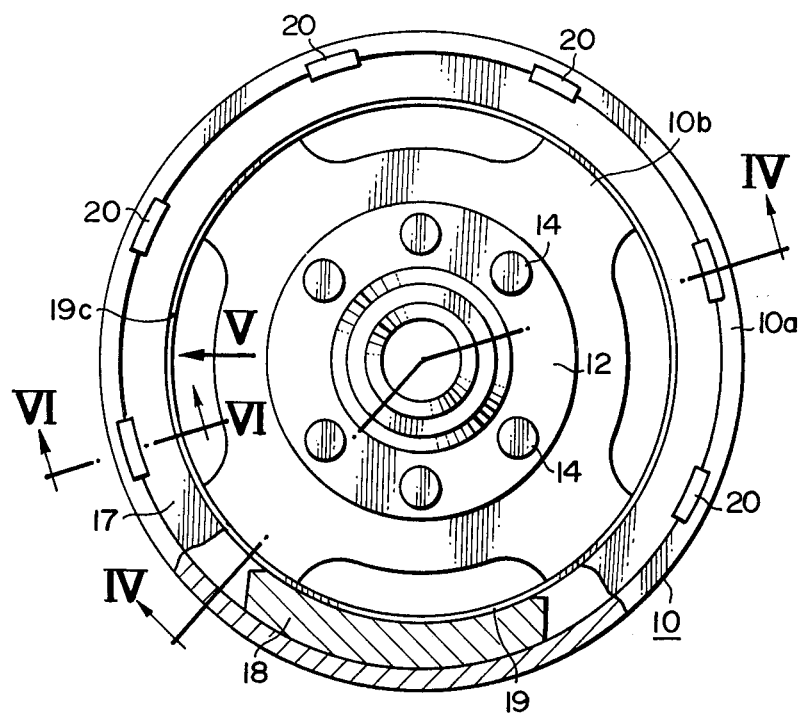
FIG. 3 is a schematic plan view of an embodiment of the rotor structure of the present invention for use in an outer rotor type magneto generator.
Figure 4:
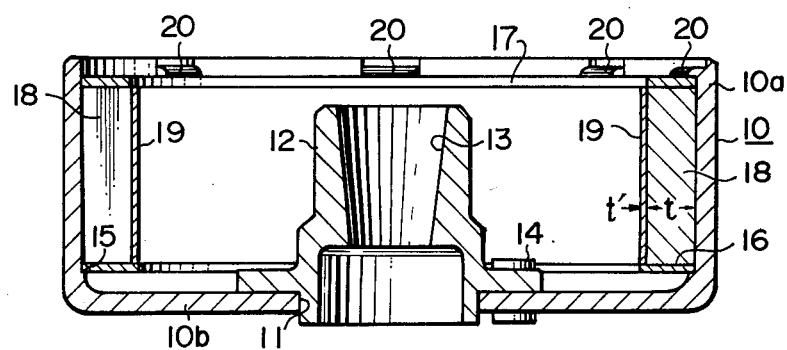
FIG. 4 is a schematic sectional view taken along the line IV—IV in FIG. 3.

FIGS. 3 and 4 show a preferred embodiment of the rotor structure according to the present invention. Referring to FIGS. 3 and 4, a cup-shaped yoke 10 of magnetic material such as iron consists of an integral assembly of a cylindrical wall 10a and a side wall 10b, and a boss 12 is firmly fitted in a central opening 11 of the side wall 10b of the yoke 10. This boss 12 includes a tapered portion 13 with which a rotary element, for example, the crankshaft of an internal combustion engine is drivingly engaged. The boss 12 is securely fixed to the side wall 10b of the yoke 10 by a plurality of rivets 14.

A circumferential shoulder 15 is formed on the inner surface of the cylindrical wall 10a adjacent to the side wall 10b of the yoke 10 as seen in FIG. 4, and a first annular magnet holding plate 16 in the form of, for example, a sheet of aluminum rests on this shoulder 15. This holding plate 16 has an outer diameter substantially equal to or somewhat smaller, about by 0.2 mm, than the inner diameter of the cylindrical wall 10a of the yoke 10 and an inner diameter smaller than its outer diameter about by $2(t + t')$ where $t$ is the thickness of magnets 18 and $t'$ is the thickness of cylindrical magnet holding plate 19 which are described below. A plurality of magnets 18 of alternately opposite polarity are disposed in equally spaced apart relation on the first annular holding plate 16. These magnets 18 are provided by grinding magnets of sintered ferrite to a uniform thickness and are shaped so that their outer peripheral surface engaging the yoke 10 has a curved contour substantially conforming to that of the inner surface of the cylindrical wall 10a of the yoke 10, and their inner peripheral surface facing the boss 12 has a curved contour substantially coaxial with that of the inner surface of the cylindrical wall 10a of the yoke 10.

Figure 5:
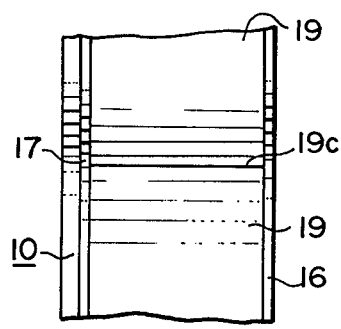
FIG. 5 is a schematic elevational view as viewed in a direction of the arrow V in FIG. 3 to illustrate the butt joint portion of the cylindrical magnet holding member employed in the embodiment shown in FIG. 3.

A cylindrical magnet holding plate 19 is disposed in a substantially cylindrical space defined by the inner peripheral surfaces of the plural magnets 18. This cylindrical holding plate 19 is in the form of, for example, a sheet of resilient steel. Thus, the magnets 18 are pressed against the inner surface of the cylindrical wall 10a of the yoke 10 by the resiliency of the cylindrical holding plate 19 to be mechanically fixed in the predetermined positions. The cylindrical holding plate 19 is obtained by forming, for example, a sheet of spring steel about 0.3 mm thick into the cylindrical shape by a shaping press. The material of this cylindrical holding plate 19 may be either magnetic or non-magnetic. A straight butt joint 19c is provided in the cylindrical holding plate 19 as shown in FIG. 5 thereby preventing impartation of an axial force, when the circumferential length of this cylindrical holding plate 19 is selected to be substantially equal to the circumferential length of a cylindrical surface obtained by extending the inner peripheral surfaces of the magnets 18.

Figure 6:
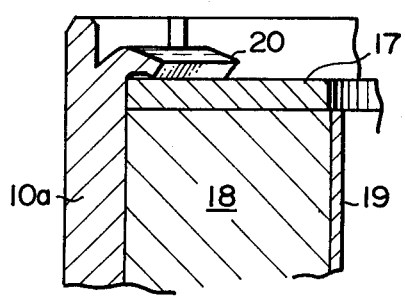
FIG. 6 is a schematic sectional view taken along the line VI—VI in FIG. 3 to illustrate how the holding piece is formed.
Figure 7:
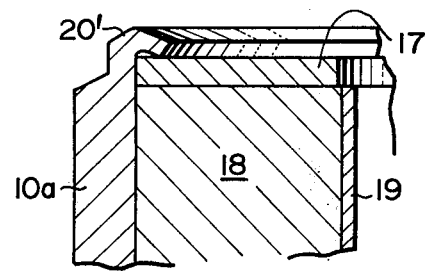
FIG. 7 is a view similar to FIG. 6 for showing a modification of the holding piece.
Figure 8:
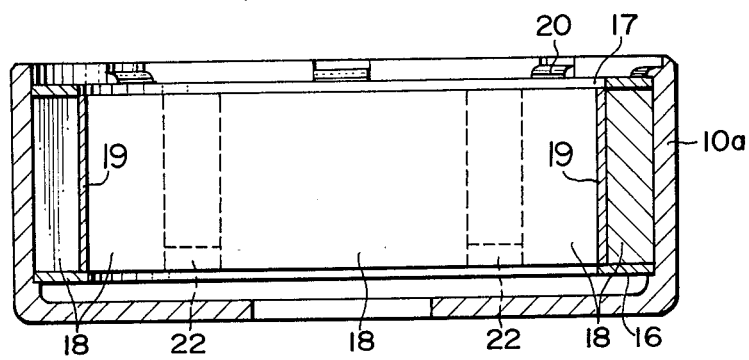
FIG. 8 is a view similar to FIG. 4 but showing the state in which the center boss is removed to illustrate how a filler is applied to fill the space between the magnets.

A second annular magnet holding plate 17 of the same shape as the first annular holding plate 16 is placed on the array of the magnets 18 fixed in the predetermined positions. The second annular holding plate 17 may be formed to have an inner diameter smaller than its outer diameter about by $2t$, i.e. larger than the inner diameter of the first annular holding plate 16 by $2t'$ for facilitating application of an adhesive described later. A plurality of holding pieces 20 project radially inwardly from the yoke 10 to engage the upper surface of the second annular holding plate 17. Thus, the holding pieces 20 and shoulder 15 act to firmly hold therebetween the magnets 18 and first and second annular holding plates 16 and 17. The holding pieces 20 are provided for firmly holding the magnets 18 in the axial direction of the yoke 10 and are formed by locally subjecting the inner circumferential edge of the cylindrical wall 10a of the yoke 10 to plastic deformation thereby causing such portions to project radially inwardly from the inner surface of the cylindrical wall 10a of the yoke 10 as best shown in FIG. 6. These holding pieces 20 are formed at a plurality of equally spaced points along the cirfumference of the cylindrical wall 10a of the yoke 10. The holding pieces 20 are brought into pressure engagement with the upper surface of the second annular holding plate 17 by simultaneously uniformly deforming the holding pieces 20 while imparting an axial pressure to the upper surface of the second annular holding plate 17. An alternation of the holding pieces 20 is shown in FIG. 7. Referring to FIG. 7, the cylindrical wall 10a of the yoke 10 has a thin-walled upper end edge portion which is curled to provide a holding flange 20' extending along the entire circumference of the cylindrical wall 10a of the yoke 10 to to be brought into pressure engagement with the upper surface of the second annular holding plate 17. The form shown in FIG. 7 is effective in providing a greater holding effect. Subsequently, in order to ensure the fixation of the individual components, a thermoplastic adhesive such as a varnish or an epoxy resin is poured into or filled in part of the space between the individual components. This adhesive may be filled as a filler in part of the space defined by the magnets 18, the cylindrical wall 10a of the yoke 10, and the magnet holding plates 16, 17 and 19 in such a manner as to bridge the adjacent magnets 18 as shown at 22 in FIG. 8. The application of the filler 22 is effective in preventing undesirable circumferential displacement of the magnetic poles 18 from their predetermined positions. Any other suitable material may be used as the filler to exhibit the effect similar to that above described.

Figure 9:
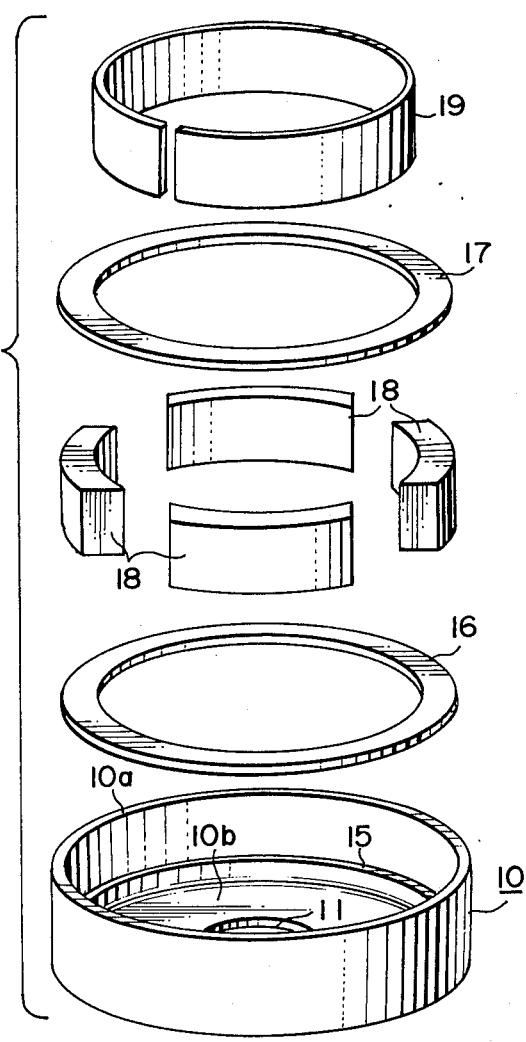
FIG. 9 is a schematic exploded perspective view of the components of the rotor structure shown in FIG. 3.

The individual components of the rotor structure are shown in exploded perspective fashion in FIG. 9 so that the assembling order of these components in the yoke 10 can be easily understood. In assembling the rotor structure, the first annular holding plate 16 is placed to rest on the shoulder 15 provided on the inner surface of the cylindrical wall 10a of the yoke 10, and after disposing the magnets 18 in the predetermined positions on the first annular holding plate 16, the second annular holding plate 17 is placed to cover the upper surface of the magnets 18. After the magnets 18 have thus been maintained in their predetermined positions, the cylindrical holding plate 19 is disposed to be engaged with the inner peripheral surfaces of the magnets 18, and the holding pieces 20 (or holding flange 20') are brought into pressure engagement with the upper surface of the second annular holding plate 17 as shown in FIGS. 3 and 4. The adhesive is then filled in part of the space between the individual components to complete the assembling of the rotor structure. It will thus be seen that the rotor structure according to the present invention can be fabricated with a reduced number of fabricating and assembling steps thereby increasing the productivity due to the fact that mounting and fixing means such as bolts, bolt holes and threaded holes are unnecessary structurally.

In the rotor structure thus completed, the magnets 18 are completely enclosed in and protected against damage by the envelope consisting of the cylindrical wall 10a of the yoke 10 and the magnet holding plates 16, 17 and 19. Therefore, cracks and other damage are difficult to occur in the magnetic poles 18, and even if such damage might occur, fragments are prevented from falling into the rotor structure.

FIGS. 10 to 14 show other embodiments or modifications of the rotor structure according to the present invention.

Figure 10:
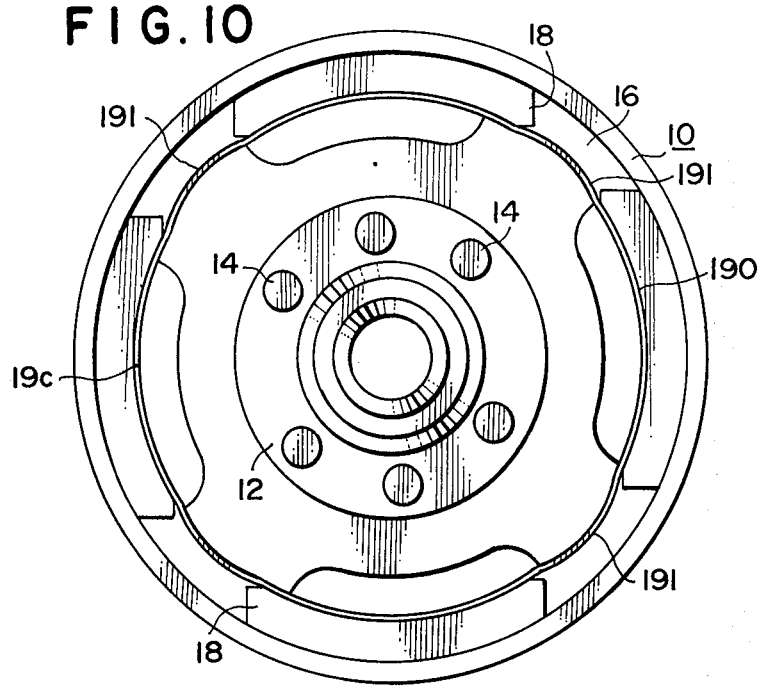
FIGS. 10 and 11 are schematic plan views of other embodiments of the present invention to show modifications of the cylindrical magnet holding member.
Figure 11:
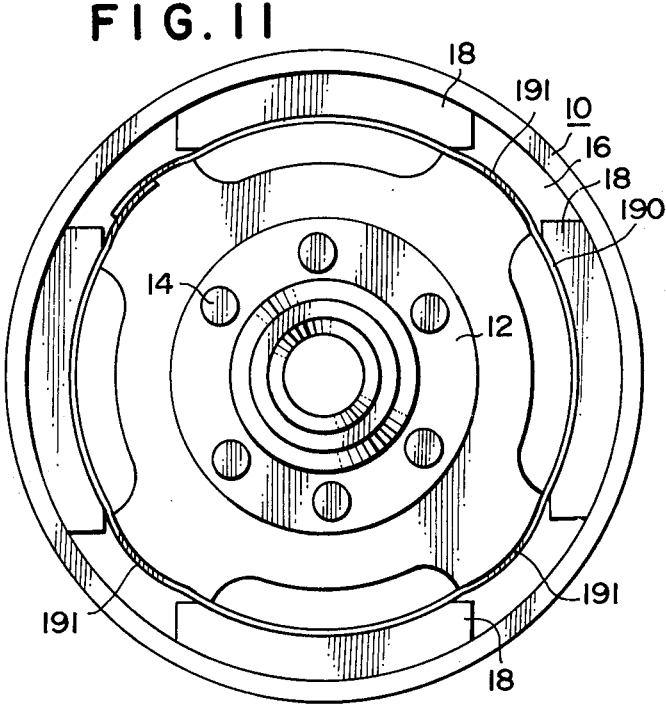

In the embodiment described with reference to FIGS. 3 to 9, the magnetic pole holding plate 19 is in the form of a cylinder having flat surfaces. In a modification as shown in FIG. 10, the magnet holding plate 190 includes a plurality of radially outwardly expanded portions 191 so as to impart a greater pressure to the inner peripheral surfaces of the magnets 18. In this case, the circumferential length of the holding plate 190 is selected to be longer by the total length of the expanded portions 191 than the circumferential length of a cylindrical surface obtained by extending the inner peripheral surfaces of the magnets 18. The provision of the expanded portions 191 in the holding plate 190 is advantageous in that the holding plate 190 makes more intimate engagement with the inner peripheral surfaces of the magnets 18 so that the magnets 18 can be more firmly held in the yoke 10. The circumferential ends of the cylindrical holding plate 190 may form a straight butt joint as shown at 190c in FIG. 10, or such ends may form a lap joint at the expanded portion 191 as shown in FIG. 11 and be welded at the lap joint to exhibit the same effect. In this latter case, the magnet holding plate 190 is actually mounted in position after carrying out the welding on the lap joint.

Figure 12:
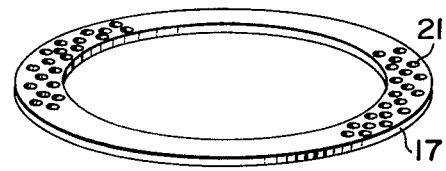
FIG. 12 is a schematic perspective view of a modification of an annular magnet holding member which is modified to have a multiplicity of perforations.

In order to facilitate pouring of the adhesive after the second annular holding plate 17 has been mounted on the magnets 18 and the holding pieces 20 (or holding flange 20') have been brought into pressure engagement with the second annular holding plate 17, it is preferable to provide a multiplicity of perforations 21 in the second annular holding plate 17 as shown in FIG. 12. The diameter of these perforations 21 is determined to be as small as possible within the range in which the perforations 21 permit unobstructed adhesive pouring operation, so as to prevent objectionable falling of fragments of the magnets 18 into the rotor structure even if damage to the magnets 18 might occur. The provision of the perforations 21 in the second annular holding plate 17 is advantageous in that the adhesive can more effectively be applied to the desired areas thereby increasing the reliability of fixation of the individual components. The adhesive may be applied before the second annular holding plate 17 is mounted in position. It is apparent that the aforementioned perforations 21 are unnecessary in such a case.

Figure 13:
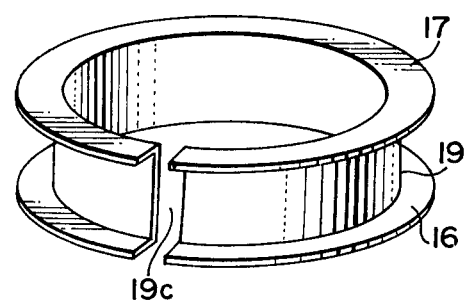
FIG. 13 is a schematic perspective view of a modification of the magnet holding members in which the annular and cylindrical holding members ae constructed as a unit.

The magnet holding plates 16, 17 and 19 illustrated in the aforementioned embodiment and modifications may be constructed as an integral unit as shown in FIG. 13. In the form shown in FIG. 13, the annular holding plates 16 and 17 are welded at their inner peripheral edges respectively to the lower and upper circumferential edges of the cylindrical holding plate 19. The integration of the holding plates 16, 17 and 19 in the manner shown in FIG. 13 is advantageous in that the number of assembling parts is decreased to reduce the steps of assembling, which can increase the productivity of the rotor structure.

Figure 14:
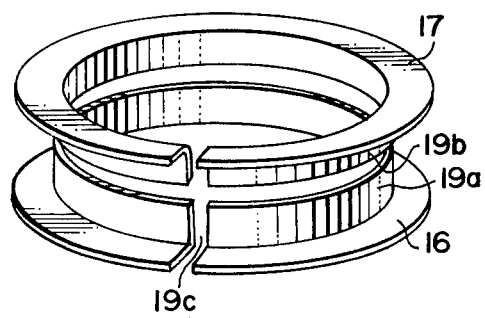
FIG. 14 is a schematic perspective view of a modification of the form shown in FIG. 13, in which the magnet holding unit is axially split into halves.

The cylindrical holding member 19 may be axially split into halves 19a and 19b each having a height equal to ½ of the original value as shown in FIG. 14. The first and second annular holding plates 16 and 17 are welded at their inner peripheral edges to the lower and upper circumferential edges of the halves 19a and 19b of the cylindrical holding plate 19. It is apparent that this form exhibits also the effect similar to that of the form shown in FIG. 13.

We claim:

1. A rotor structure for use in a magneto generator including a yoke of cup-like shape consisting of a cylindrical wall and a side wall extending from one end of said cylindrical wall, a plurality of magnets provided by permanent magnets disposed along the circumference of said cylindrical wall of said yoke in a relation circumferentially spaced apart by a predetermined distance, each said magnet having first and second flat surfaces axially facing each other, an outer peripheral surface curved to conform substantially to the curved contour of the inner surface of said cylindrical wall of said yoke and an inner peripheral surface curved to be substantially coaxial with the curved contour of the inner surface of said cylindrical wall of said yoke, said magnets being arranged in area contact with the inner surface of said cylindrical wall by means of their outer peripheral surfaces, and means for holding said magnets in predetermined positions wherein said holding means comprises a first magnet holding plate disposed on a circumferential shoulder formed at a predetermined position on the inner surface of said cylindrical wall of said yoke, said first magnet holding plate having a surface on which said magnets are disposed in area contact by means of their first flat surfaces, a second magnet holding plate disposed in area contact with the second flat surfaces of said magnets, to axially face said first magnet holding plate, and a third magnet holding plate of cylindrical shape arranged in area contact with the inner peripheral surfaces of said magnets to press said magnets against the inner surface of said cylindrical wall of said yoke.

2. A rotor structure as claimed in claim 1, wherein said first, second and third magnet holding plates are constructed as an integral unit.

3. A rotor structure as claimed in claim 1, wherein said third magnet holding plate of cylindrical shape is axially split into a first cylindrical half and a second cylindrical half, and said first and second magnet holding plates are joined integrally to said first and second cylindrical halves respectively.

4. A rotor structure as claimed in claim 1, wherein the circumferential length of said third magnet holding plate of cylindrical shape is substantially equal to that of a cylindrical surface obtained by extending the inner peripheral surfaces of said magnets disposed in the predetermined positions.

5. A rotor structure as claimed in claim 1, wherein the circumferential length of said third magnet holding plate of cylindrical shape is larger than that of a cylindrical surface obtained by extending the inner peripheral surfaces of said magnets disposed in the predetermined positions.

6. A rotor structure as claimed in claim 1, wherein said holding means further comprises at least one holding piece formed by subjecting a portion of one of the circumferential edges of said cylindrical wall of said yoke to plastic deformation to cause such a portion to project radially inwardly from said cylindrical wall of said yoke, said holding piece being brought into pressure engagement with the surface of said second magnet holding plate opposite to its surface making area contact with said magnets.

7. A rotor structure as claimed in claim 6, wherein a plurality of said holding pieces are provided in equally circumferentially spaced relation along the circumference of said cylindrical wall of said yoke.

8. A rotor structure as claimed in claim 6, wherein said holding piece is in the form of a single circumferential flange formed by subjecting the entire circum circumferential edge of said cylindrical wall of said yoke to plastic deformation to extend throughout the ference of said cylindrical wall of said yoke.

9. A rotor structure as claimed in claim 1, wherein said second magnet holding plate is provided with a plurality of perforations of small diameter.

10. A rotor structure as claimed in claim 1, wherein said magnets disposed in the predetermined positions are completely enclosed in an envelope formed by said first, second and third magnet holding plates and said cylindrical wall of said yoke.

11. A rotor structure as claimed in claim 10, wherein a filler is filled in part of the space defined by said magnets, said cylindrical wall of said yoke and said first, second and third magnet holding plates, said filler bridging the adjacent ones of said magnets.

* * * * *